(12) United States Patent
Lee

(10) Patent No.: US 9,904,864 B2
(45) Date of Patent: Feb. 27, 2018

(54) METHOD FOR RECOMMENDING ONE OR MORE IMAGES AND ELECTRONIC DEVICE THEREOF

(71) Applicant: Samsung Electronics Co., Ltd., Gyeonggi-do (KR)

(72) Inventor: Jun-Taek Lee, Daegu (KR)

(73) Assignee: Samsung Electronics Co., Ltd (KR)

( * ) Notice: Subject to any disclaimer, the term of this patent is extended or adjusted under 35 U.S.C. 154(b) by 50 days.

(21) Appl. No.: 14/871,133

(22) Filed: Sep. 30, 2015

(65) Prior Publication Data
US 2016/0092750 A1 Mar. 31, 2016

(30) Foreign Application Priority Data

Sep. 30, 2014 (KR) ........................ 10-2014-0131798

(51) Int. Cl.
*G06K 9/46* (2006.01)
*G06K 9/00* (2006.01)
*G06F 17/30* (2006.01)

(52) U.S. Cl.
CPC ... *G06K 9/00973* (2013.01); *G06F 17/30247* (2013.01); *G06K 2209/27* (2013.01)

(58) Field of Classification Search
CPC ......... G06F 17/30265; G06F 17/30256; G06F 17/3028; G06K 2209/27
See application file for complete search history.

(56) References Cited

U.S. PATENT DOCUMENTS

| 885,952 | A | * | 4/1908 | Filip | ...................... B66B 9/187 |
| | | | | | 254/312 |
| 6,594,386 | B1 | * | 7/2003 | Golshani | ............. G06F 17/3025 |
| | | | | | 382/166 |
| 8,891,907 | B2 | * | 11/2014 | Petrou | ..................... G06F 3/048 |
| | | | | | 382/305 |
| 9,418,482 | B1 | * | 8/2016 | Yang | ................. G06F 17/30265 |
| 2006/0120627 | A1 | * | 6/2006 | Shiiyama | ........... G06K 9/00456 |
| | | | | | 382/305 |
| 2008/0162450 | A1 | | 7/2008 | McIntyre et al. | |
| 2009/0324103 | A1 | * | 12/2009 | Gelfand | ............ G06F 17/30265 |
| | | | | | 382/224 |
| 2011/0158558 | A1 | * | 6/2011 | Zhao | ................. G06F 17/30256 |
| | | | | | 382/305 |
| 2011/0314049 | A1 | * | 12/2011 | Poirier | .............. G06F 17/30241 |
| | | | | | 707/769 |
| 2015/0220788 | A1 | * | 8/2015 | Mazur | ............... G06Q 30/0257 |
| | | | | | 382/218 |

\* cited by examiner

*Primary Examiner* — Bhavesh Mehta
*Assistant Examiner* — Ian Lemieux
(74) *Attorney, Agent, or Firm* — The Farrell Law Firm, P.C.

(57) ABSTRACT

A method for displaying one or more images in an electronic device is provided, which includes displaying a first image; retrieving at least one second image on the basis of additional information of the first image; comparing at least one first feature point of the first image with at least one second feature point of the at least one second image; displaying information on whether at least one recommended image with respect to the first image exists, based on a result of the comparison; and if the at least one recommended image exists, displaying the at least one recommended image according to a user input.

25 Claims, 12 Drawing Sheets
(7 of 12 Drawing Sheet(s) Filed in Color)

METHOD FOR RECOMMENDING ONE OR MORE IMAGES AND ELECTRONIC DEVICE THEREOF

PRIORITY

This application claims priority under 35 U.S.C. § 119(a) to Korean Application Serial No. 10-2014-0131798, which was filed in the Korean Intellectual Property Office on Sep. 30, 2014, the entire content of which is incorporated herein by reference.

BACKGROUND OF THE INVENTION

1. Field of the Invention

The present invention generally relates to a method for retrieving and providing images that are similar to a photo taken by a camera module or a photo stored in an electronic device and an electronic device thereof.

2. Description of the Related Art

The method for matching images to each other includes the technology of retrieving images. The image retrieval technology includes a method for retrieving only the contents of the target image and a method for retrieving the contents of the image together with text related to the corresponding image. The former is referred to as contents-based image retrieval (CBIR), and the latter is referred to as text-based image retrieval (TBIR).

FIG. 1A shows a case in which the images are retrieved by the TBIR method, and FIG. 1B shows a case in which the images are retrieved by the CBIR method.

As the user views images, particularly photos taken while travelling, which are stored in an electronic device, the user may not be satisfied with the photos that have been taken, for example, at tourist attractions, on a cloudy day, or at certain angles. In this case, the user may wish to only view photos that make the user satisfied, for example, photos that helps the user to recall memories.

The TBIR method may satisfy the user by allowing the user to view photos that the user wants to view. However, the TBIR method is tiresome because the user needs to know the text that is related to the image (photo) that the user wants to view.

The CBIR method extracts feature points by using image processing technology and compares the feature points to thereby retrieve the image. Therefore, the CBIR method requires a large amount of calculation and power consumption. Furthermore, the user may not be satisfied with the result of retrieval by the CBIR method. Referring to FIG. 1B showing the images retrieved by the CBIR method, there is no correlation between the image 10 that is used for retrieval and the resultant images 20 that have been retrieved by using the image 10.

Furthermore, the image retrieval technology requires the user to conduct an additional operation of uploading the photo that he or she has taken to the image retrieval service provider.

SUMMARY OF THE INVENTION

The present invention has been made to solve at least the above-mentioned problems and/or disadvantages and to provide at least the advantages described below.

Accordingly, an aspect of the present invention provides a method for retrieving and providing images that are similar to a photo taken by a camera module or a photo stored in an electronic device and an electronic device thereof.

In accordance with an aspect of the present invention, a method for displaying one or more images in an electronic device is provided, which includes displaying a first image; retrieving at least one second image on the basis of additional information of the first image; comparing at least one first feature point of the first image with at least one second feature point of the at least one second image to determine whether they match each other; displaying information on whether at least one recommended image with respect to the first image exists, based on a result of the comparison; and if the at least one recommended image exists, displaying the at least one recommended image according to a user input.

In accordance with another aspect of the present invention, a method for displaying one or more images in an electronic device is provided, which includes determining at least one first feature point of a first image; retrieving at least one second image on the basis of location information of the first image; detecting at least one second feature point of the at least one second image; determining at least one recommended image according to a result of comparing the at least one first feature point with the at least one second feature point; and displaying the at least one recommended image.

In accordance with another aspect of the present invention, an electronic device for displaying one or more images is provided, which includes a display configured to display a first image; an image control module configured to: determine at least one first feature point in the first image, retrieve at least one second image on the basis of additional information of the first image, extract at least one second feature point from the at least one second image, determine at least one recommended image on the basis of a result of comparing the at least one first feature point with the at least one second feature point, and control the display to display the at least one recommended image according to a user input.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1A:
FIG. 1A illustrates an example in which images are retrieved by the TBIR method.

Hereinafter, various embodiments of the present invention will be described with reference to the accompanying drawings. The present invention may be modified in various forms and include various embodiments, but specific examples are illustrated in the drawings and described in the description. However, the description is not intended to limit the present invention to the specific embodiments, and it shall be appreciated that all the changes, equivalents and substitutions belonging to the idea and technical scope of the present invention are included in the present invention. In the description of the drawings, identical or similar reference numerals are used to designate identical or similar elements.

The term "include" or "may include" refers to the existence of a corresponding disclosed function, operation or component which can be used in various embodiments of the present invention and does not limit one or more additional functions, operations, or components. In the present disclosure, the terms such as "include" or "have" may be construed to denote a certain characteristic, number, step, operation, constituent element, component, or a combination thereof, but may not be construed to exclude the existence of or a possibility of addition of one or more other characteristics, numbers, steps, operations, constituent elements, components, or combinations thereof.

The term "or" used in various embodiments of the present invention includes any or all of combinations of listed words. For example, the expression "A or B" may include A, may include B, or may include both A and B.

The expression "1", "2", "first", or "second" used in various embodiments of the present invention may modify various components of various embodiments but does not limit the corresponding components. For example, the above expressions do not limit the sequence and/or importance of the corresponding elements. The expressions may be used to distinguish a component element from another component element. For example, a first user device and a second user device indicate different user devices although both of them are user devices. For example, without departing from the scope of the present invention, a first component element may be referred to as a second component element. Similarly, the second component element also may be referred to as the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The term "module" used in various embodiments of the present invention may refer to, for example, a "unit" including one of hardware, software, and firmware, or a combination of two or more of the hardware, software, and firmware. The term "module" may be interchangeably used with another term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present invention may include at least one of an Application-Specific Integrated Circuit (ASIC) chip, a Field-Programmable Gate Arrays (FPGAs), and a programmable-logic device for performing operations which have been known or are to be developed hereafter. In the present disclosure, the terms are used to describe a specific embodiment, and are not intended to limit the present invention. As used herein, singular forms are intended to include plural forms as well, unless the context clearly indicates otherwise.

Unless defined differently, all terms used herein, which include technical terminologies or scientific terminologies, have the same meaning as understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present invention.

Electronic devices according to various embodiments of the present invention may be devices adopting a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), moving picture experts group (MPEG) audio layer 3 (MP3) players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches.

According to various embodiments of the present invention, an electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to various embodiments of the present invention, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to various embodiments of the present invention, the electronic devices may include at least one of furniture or a part of a building/structure having a communication function, electronic boards, electronic signature receiving devices, projectors, or various measuring equipment (e.g., equipment for a water supply, an electricity, gases or radio waves). An electronic device according to various embodiments of the present invention may be a combination of one or more of above described various devices. An electronic device according to various embodiments of the present invention may be a flexible device. An electronic device according to various embodiments of the present invention is not limited to the above described devices.

Hereinafter, an electronic device according to various embodiments of the present invention will be described with reference to the accompanying drawings. In various embodiments of the present invention, the term "user" may indicate a person using an electronic device or a device (e.g. an artificial intelligence electronic device) using an electronic device.

Figure 2:
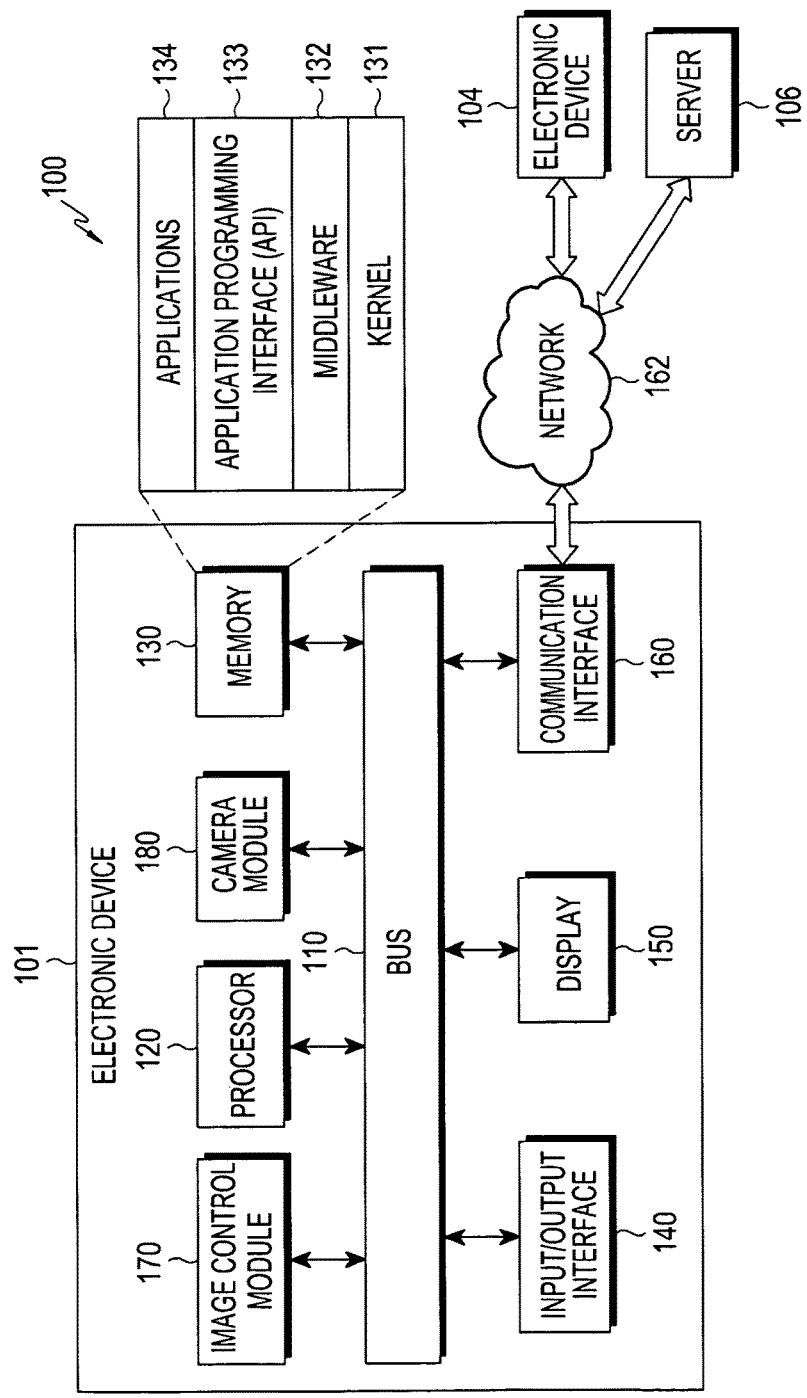
FIG. 2 illustrates a network environment including an electronic device 101 according to an embodiment of the present invention.

FIG. 2 illustrates a network environment 100 including an electronic device 101 according to an embodiment of the present invention.

Referring to FIG. 2, the electronic device 101 includes a bus 110, a processor 120, a memory 130, an input/output interface 140, a display 150, a communication interface 160, an image control module 170, and a camera module 180. The bus 110 may be a circuit for connecting elements of the electronic device 10 with each other and transferring communication data (e.g., control messages) between the elements.

The processor 120 receives instructions from other elements (e.g., the memory 130, the input/output interface 140, the display unit 150, the communication interface 160, the image control module 170, the camera module 180, or the like) through, for example, the bus 110, and then decodes the received instructions and performs calculation or data processing according to the decoded instructions.

The memory 130 stores instructions or data that are received from the processor 120 or other elements (e.g., the input/output interface 140, the display unit 150, the communication interface 160, the image control module 170, the camera module 180, or the like) or that are created by the processor 120 or other elements. The memory 130 may include programming modules such as, a kernel 131, a middleware 132, an application programming interface (API) 133, or applications 134. Each of the programming modules may be configured by software, firmware, hardware, or a combination thereof.

According to an embodiment of the present invention, the memory 130 stores photo images created by the camera module 180, or stores location information (e.g., GPS coordinates) and feature points of images pre-stored in the memory 130 and matching counter values of the feature points to correspond to the images. A single image, location information, feature points, important points, and matching counter values with respect to the image may be stored as a single image file in the memory 130. Hereinafter, the photo images that are created by the camera module 180 or the images that are pre-stored in the memory 130 will be referred to as a first image. The first image may be pre-stored in the memory 130, or may be received from external devices (e.g., electronic device 104 or server 106) to be stored in the memory 130.

The kernel 131 controls or manages system resources (e.g., the bus 110, the processor 120, the memory 130, or the like) that are used in performing operations or functions implemented by other programming modules, for example, the middleware 132, the API 133 or the applications 134. Furthermore, the kernel 131 provides an interface by which the middleware 132, the API 133, or the applications 134 may access each element of the electronic device 10 for control or management.

The middleware 132 plays the intermediate role between the API 133 or the applications 134 and the kernel 131 to communicate with each other for transmission and reception of data. Furthermore, in relation to requests for operations received from the applications 134, the middleware 132 controls (e.g., scheduling or load-balancing) the requests, for example, by giving priority for using system resources (e.g., the bus 110, the processor 120, the memory 130, or the like) of the electronic device 101 to at least one of the applications 134.

The API 133 is an interface by which the applications 134 control functions provided from the kernel 131 or the middleware 132, and it may include, for example, at least one interface or function (e.g., instructions) for file control, window control, image processing, or text control.

According to an embodiment of the present invention, the applications 134 may include a short message service (SMS)/multimedia message service (MMS) application, an e-mail application, a calendar application, an alarm application, a health care application (e.g., an application for measuring the amount of exercise or blood sugar), an environmental information application (e.g., an application for providing atmospheric pressure, humidity, or temperature), or the like. Alternatively, the applications 134 may be an application related to the exchange of information between the electronic device 101 and external electronic devices (e.g., electronic device 104). The information-exchange-related application may include, for example, a notification relay application for relaying specific information to the external electronic device, or a device management application for managing the external electronic device.

For example, the notification relay application may include a function of transferring notification information created in other applications (e.g., the SMS/MMS application, the e-mail application, the health care application, or the environmental information application) of the electronic device 101 to external electronic device 104. Alternatively, the notification relay application may receive notification information from, for example, an external electronic device (e.g., the electronic device 104) and provide the same to a user. The device management application may manage (e.g., install, delete, or update), for example, at least some functions (e.g., turning external electronic device (or some elements) to be on or off, or adjusting the brightness (or resolution) of a display) of an external electronic device 104 that communicates with the electronic device 101, applications executed in the external electronic device, or services (e.g., a phone call service, or a messaging service) provided in the external electronic device.

According to an embodiment of the present invention, the applications 134 may include applications, which are designated according to the properties (e.g., the type of electronic device) of the external electronic device 104. For example, if the external electronic device is an MP3 player, the applications 134 may include applications related to reproduction of music. If the external electronic device is a mobile medical device, the applications 134 may include an application related to a health care. According to an embodiment of the present invention, the application 134 may include at least one of applications designated in the electronic device 101 or applications received from external electronic devices (e.g., electronic device 104 or server 106).

The input/output interface 140 transfers instructions or data input by the user through input/output devices (e.g., sensors, keyboards, or touch screens) to the processor 120, the memory 130, the communication interface 160, the image control module 170, or the camera module 180 through, for example, the bus 110. For example, the input/output interface 140 may provide data on a user's touch input through a touch screen to the processor 120. For example, the input/output interface 140 may output instructions or data, which are received from the processor 120, the memory 130, the communication interface 160, the image control module 170, or the camera module 180 through the bus 110, through the input/output devices (e.g., speakers or displays). For example, the input/output interface 140 may output audio data processed by the processor 120 to the user through the speaker.

The display 150 displays various pieces of information (e.g., multimedia data or text data) to the user. According to an embodiment of the present invention, the display 150 displays a specific image and at least one recommended image for the specific image.

The communication interface 160 performs communication between the electronic device 101 and external electronic devices 104 or 106. For example, the communication interface 160 may be connected to a network 162 through wireless communication or wired communication to thereby communicate with the external electronic device. The wireless communication may include at least one of Wi-Fi, Bluetooth (BT), near field communication (NFC), a global positioning system (GPS), or cellular communication (e.g., long term evolution (LTE), LTE advanced (LTE-A), code division multiple access (CDMA), wideband CDMA (WCDMA), universal mobile telecommunications system (UMTS), wireless broadband (WiBro), or global system for mobile communication (GSM)). The wired communication may include at least one of a universal serial bus (USB), a high definition multimedia interface (HDMI), recommended standard 232 (RS-232), or a plain old telephone service (POTS).

According to an embodiment of the present invention, the communication interface 160 connects with a web server through the Internet to thereby allow the image control module 170 to search for a recommended image corresponding to the specific image from the web server.

According to an embodiment of the present invention, the network 162 may be telecommunication networks. The telecommunication networks may include at least one of a computer network, the Internet, the Internet of things, or a telephone network. According to an embodiment of the present invention, protocols (a transport layer protocol, a data link layer protocol, or a physical layer protocol) for communication between the electronic device 101 and external electronic devices may be supported by at least one of the applications 134, the API 133, the middleware 132, the kernel 131, or the communication interface 160.

The image control module 170 processes at least some of information obtained from other elements (e.g., the processor 120, the memory 130, the input/output interface 140, the communication interface 160, the camera module 180, or the like), and provides the same to the user in various manners. For example, the image control module 170 may, independently or by using the processor 120, control at least some functions of the electronic device 101 so that the electronic device 101 interworks with other electronic devices 104 106. The image control module 170 will be described in more detail with reference to FIGS. 3 to 9. According to an embodiment of the present invention, the image control module 170 may be implemented in the form of software or firmware to be thereby stored in the memory 130.

The camera module 180 photographs still images and moving images. According to an embodiment of the present invention, the camera module 180 may include one or more image sensors (e.g., front sensor or rear sensor), lenses, an image signal processor (ISP), or a flash (e.g., LED or xenon lamp). The camera module 180 may convert images input through the lenses into image files (e.g., files of jpeg format). The camera module 180 stores the image files in the memory 130 under the control of the image control module 170.

According to an embodiment of the present invention, the electronic device for displaying one or more images may include a display configured to display the first image; an image control module configured to: determine one or more of the first feature points in the first image, retrieve one or more of the second images on the basis of additional information of the first image, extract one or more of the second feature points from the second images, determine one or more recommended images on the basis of the result of comparing the first feature points with the second feature points, and control the display to display the recommended images according to a user input.

Figure 3:
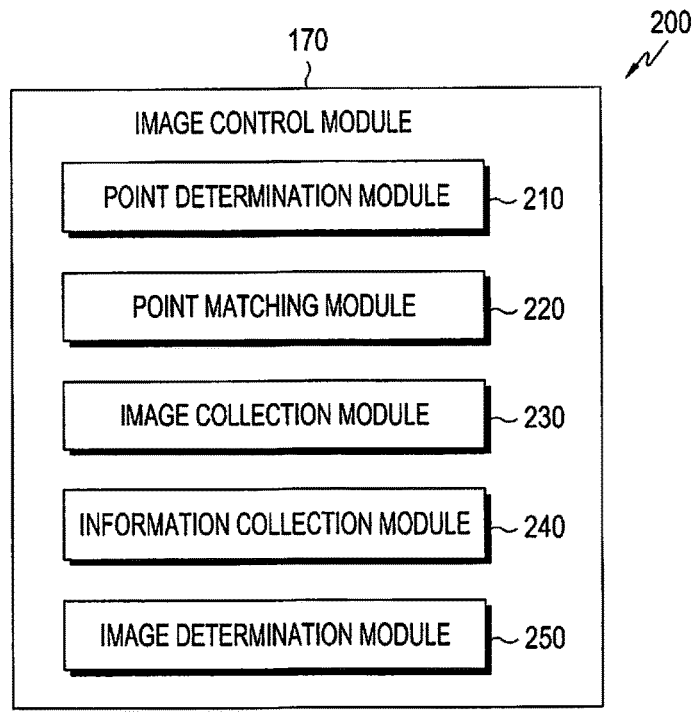
FIG. 3 is a block diagram of a configuration of an image control module of an electronic device according to an embodiment of the present invention.

FIG. 3 is a block diagram 200 of a configuration of an image control module 170 of an electronic device (e.g., electronic device 101) according to an embodiment of the present invention.

Referring to FIG. 3, the image control module 170 includes at least one of a point determination module 210, a point matching module 220, an image collection module 230, an information collection module 240, and an image determination module 250.

The point determination module 210 determines a plurality of first feature points with respect to the first image. The point determination module 210 may determine points (e.g., edges, corners, and blocks), at which brightness, chroma, or color is sharply changed, as the first feature points of the first image.

The point matching module 220 determines one or more important points among the first feature points. Specifically, the point matching module 220 counts a matching count value of each of the first feature points. Whenever a certain first feature point of the first image matches a second feature point of an image (hereinafter, referred to as the second image) that is retrieved by the image collection module 230, the matching count value of the certain first feature point increases by one. The point matching module 220 determines the first feature points that have matching count values greater than or equal to a predetermined reference value as the important points.

For example, if the image collection module 230 retrieves ten second images, the point matching module 220 may compare the first feature points of the first image with the second feature points of each of the ten second images. In this case, the maximum matching count value of the first feature points of the first image may be ten.

The image collection module 230 retrieves the second images from the memory 130 or the server 106 (e.g., web servers) by using additional information of the first image, for example, the location information showing the place where the first image is created (e.g., the place where the first image has been taken), resolution, photographed time, direction, capacity, or the like. For example, the location information may be GPS coordinates, and the image collection module 230 may retrieve photos that have been taken at the place of the same GPS coordinates or at the place near thereto.

The information collection module 240 determines the location information of the first image or the location information of the second images retrieved by the image collection module 230. According to an embodiment of the present invention, when a photo is taken by the camera module 180, the information collection module 240 may store the location information that shows the place where the photo has been taken as a part of the image file including the corresponding image. According to an embodiment of the present invention, the location information may be included in the image file as a tag of the photo. In addition, the location information may include, for example, the GPS coordinates of the place where the photo has been taken.

The image determination module 250 determines the second images having second feature points that match the important points of the first image among the second images retrieved by the image collection module 230 to be recommended images.

Figure 4:
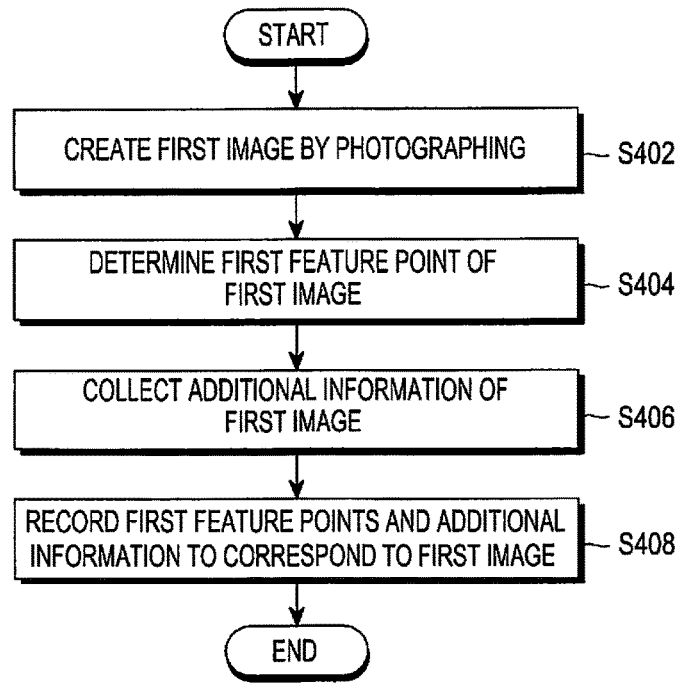
FIG. 4 is a flowchart illustrating a method of processing a first image by an electronic device according to an embodiment of the present invention.

FIG. 4 is a flowchart illustrating a method of processing the first image by the electronic device according to an embodiment of the present invention.

Referring to FIG. 4, the first image may be photographed and created by the camera module 180 of the electronic device 101 in step S402. The electronic device 101 may convert the image captured through the lenses of the camera module 180 into a data file, for example, JPG, GIF, BMP, TIFF, or the like, to thereby create the first image. According to an embodiment of the present invention, the electronic device 101 may receive a user input for photographing the first image prior to step S402. According to another embodiment of the present invention, the step S402 may be omitted, and the first image may be pre-stored in the memory 130 of the electronic device 101 or may be received from other electronic devices (e.g., electronic device 104 or server 106).

Once the first image is created, the point determination module 210 of the image control module 170 determines a plurality of the first feature points of the first image in step S404. The information collection module 240 of the image control module 170 collects additional information of the first image in step S406. Although FIG. 4 shows that step S404 is performed before step S406, step S406 may be performed before step S404 or steps S404 and S406 may be simultaneously performed in another embodiment of the present invention.

When the first feature points and the additional information are determined and collected, the image control module 170 records the first feature points and the additional information in the memory 130 to correspond to the first image in step S408. According to an embodiment of the present invention, the image control module 170 may create an image file including the first image, the first feature points, and the additional information in step S408. According to an embodiment of the present invention, the image control module 170 may include the first feature points or the additional information in the image file as a tag.

Figure 5:
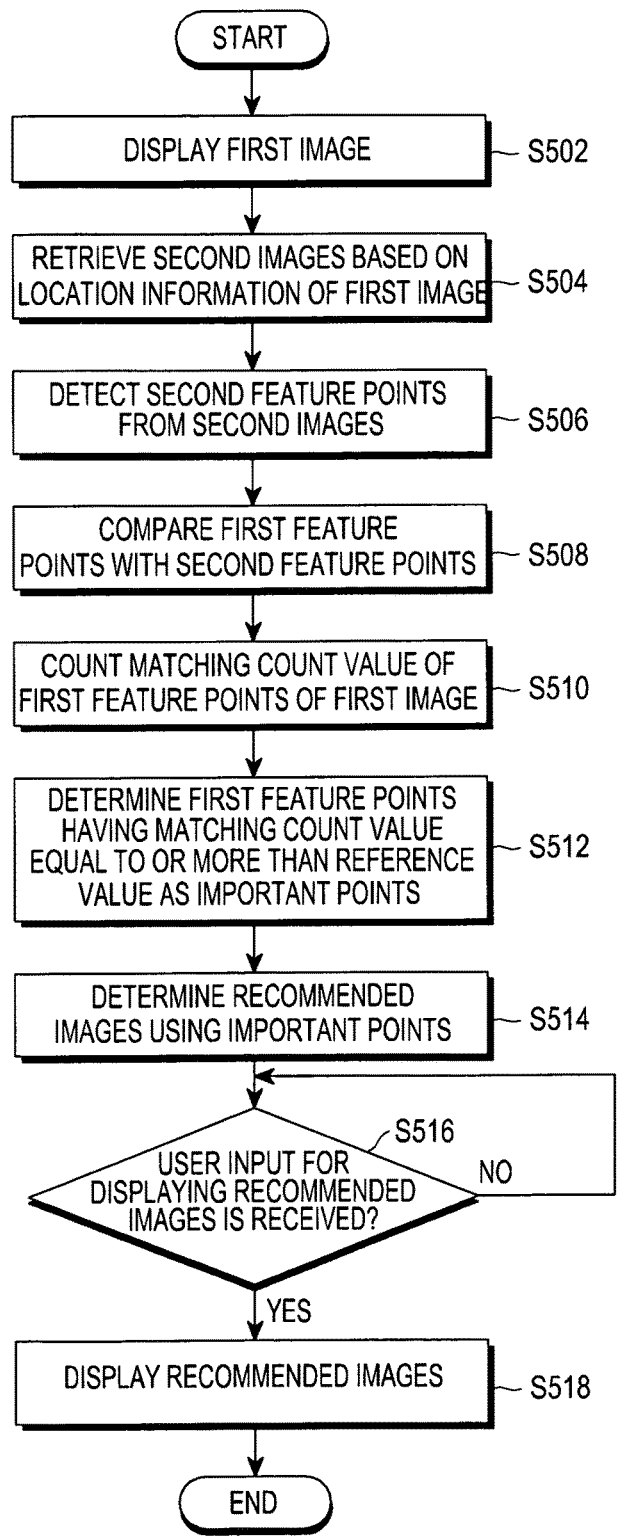
FIG. 5 is a flowchart illustrating a method of recommending images by an electronic device according to an embodiment of the present invention.

FIG. 5 is a flowchart illustrating a method of recommending images by the electronic device according to an embodiment of the present invention.

Referring to FIG. 5, the display 150 of the electronic device 101 displays the first image in step S502. According to an embodiment of the present invention, the electronic device 101 may receive a user input for displaying one or more first images from the user before step S502. Once the user input is received, the image control module 170 may control the display 150 to display thumbnails corresponding to the first images stored in the memory 130. Furthermore, the electronic device 101 may receive a user input for selecting one of the thumbnails from the user, and may display the first image corresponding to the selected thumbnail according to the user input.

When the first image is displayed, the image control module 170 retrieves the second images on the basis of the location information corresponding to the first image in step S504. With the first image displayed, the image control module 170 may identify the additional information of the first image, for example, the location information (e.g., GPS coordinates of the place where the first image has been taken). In step S504, the image control module 170 may retrieve, as the second images, photos that have the same location information as that of the first image or photos that have been taken at the place near to the place where the first image has been taken. According to an embodiment of the present invention, the image control module 170 may retrieve the second images from web servers through the Internet in step S504. According to another embodiment of the present invention, the image control module 170 may retrieve the second images from the memory 130 or other electronic devices (e.g., electronic device 104).

When the second images are retrieved, the point determination module 210 of the image control module 170 detects the second feature points of the second images in step S506. After the second feature points of the second images that have been retrieved in step S504 are determined, the point matching module 220 compares the first feature points of the first image with the second feature points of the second images in step S508.

As a result of comparing the first feature points of the first image with the second feature points of the second images, the point matching module 220 of the image control module 170 counts a matching count value with respect to each of the first feature points of the first image in step S510. For example, it is assumed that the second images includes ten images, e.g., "image 01" to "image 10", and the second feature points of each of the second images are detected by the point determination module 210. In this case, the point matching module 220 may increase the matching count value of the first feature points that match the second feature points of "image 01" by one. Also, the point matching module 220 may increase the matching count value of the first feature points that match the second feature points of "image 02" by one. Likewise, the point matching module 220 may increase the matching count values of the first feature points that match the second feature points of "image 03" to "image 10" by one.

The image control module 170 determines the first feature points having a matching count value greater than or equal to a predetermined reference value as important points in step S512. According to an embodiment of the present invention, the image control module 170 may record each of the matching count values to correspond to each of the important points as a part of the tag of the first image.

When the important points of the first image are determined, the image control module 170 determines the recommended images by using the important points in step S514. According to an embodiment of the present invention, the image control module 170 may determine, as the recommended images, one or more of the second images having the second feature points that match at least some of the important points of the first image.

Once the recommended images are determined, the image control module 170 determines whether a user input for displaying the recommended images is received in step S516. If the user input is received as a result of the determination in step S516, the image control module 170 controls the display 150 to display the recommended images in step S518. If the user input is not received as a result of the determination in step S516, the display 150 may not display the recommended images or may continue to display the first image.

A method for displaying one or more images in the electronic device according to an embodiment of the present invention may include displaying the first image, retrieving at least one image on the basis of the additional information of the first image, comparing one or more of the first feature points of the first image with one or more of the second feature points of the retrieved images, displaying information on whether or not one or more recommended images with respect to the first image exist on the basis of the comparing result, and if one or more recommended images exist, displaying the recommended images according to the user input.

A method for displaying one or more images in the electronic device according to an embodiment of the present invention may include determining one or more of the first feature points of the first image, retrieving one or more images on the basis of the location information of the first image, detecting one or more of the second feature points from the retrieved images, determining one or more recommended images on the basis of the result of comparing the first feature points with the second feature points, and displaying the recommended images.

Figure 6A:
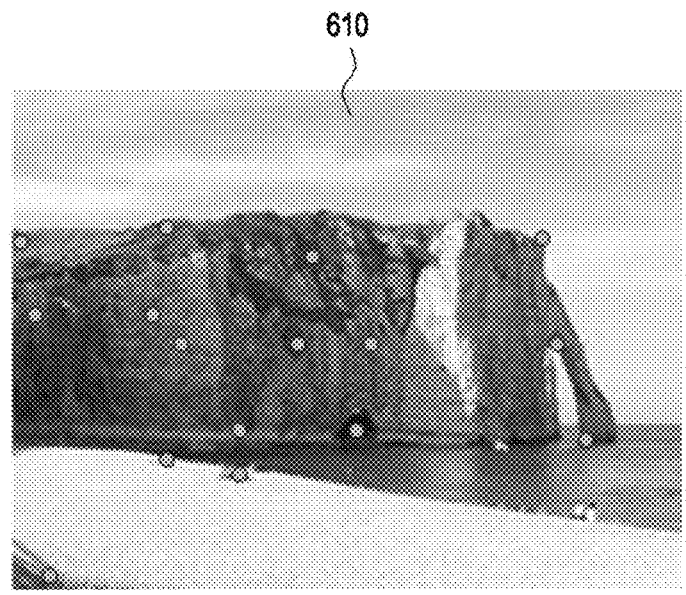
FIG. 6A illustrates a first image in which feature points that are determined by an electronic device are displayed according to an embodiment of the present invention.

FIG. 6A illustrates an example of a first image in which feature points that are determined by an electronic device are displayed according to an embodiment of the present invention. It is assumed that the first photo 610 in FIG. 6A is the first image.

As shown in FIG. 6A, the point determination module 210 detects a plurality of first feature points from the first photo 610 that has been photographed by the camera module 180. According to an embodiment of the present invention, the point determination module 210 may determine points (e.g., edges, corners, and blocks) where brightness, chroma, or color is sharply changed as the first feature points of the first photo 610. When the first feature points of the first photo 610, i.e., the first image, are determined, the point determination module 210 may store the first feature points to correspond to the first photo 610 in the memory 130 as a tag of the first photo 610.

Figure 6B:
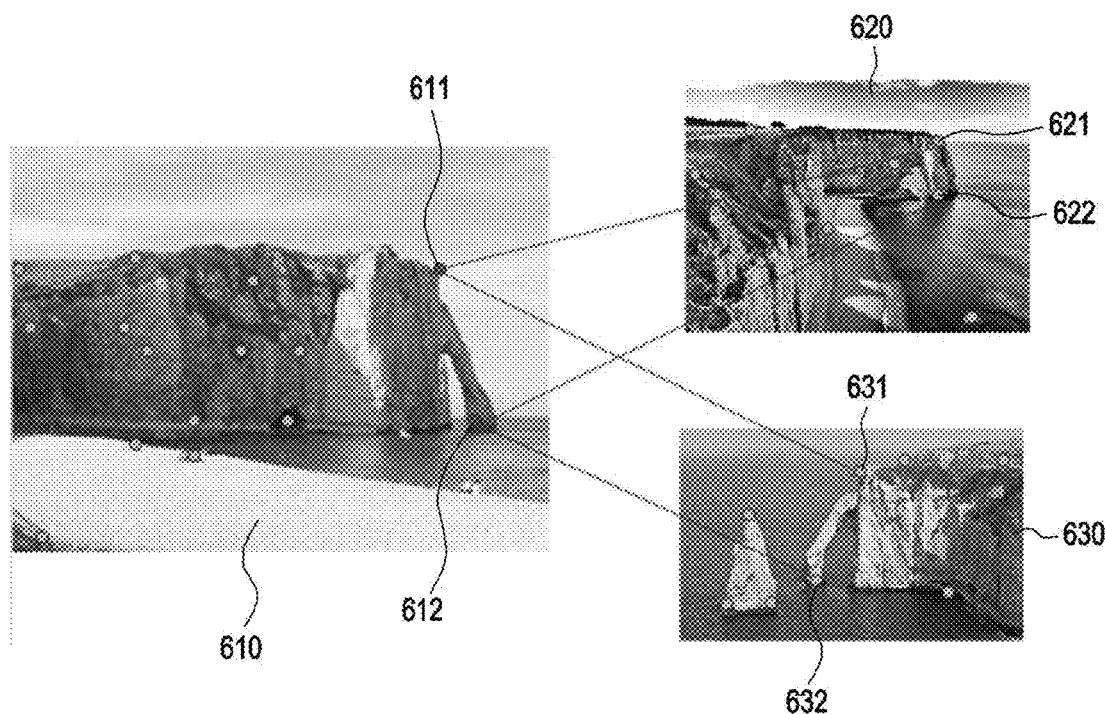
FIG. 6B illustrates an example in which an electronic device compares feature points in the first image stored in the electronic device with feature points of second images according to an embodiment of the present invention.

FIG. 6B illustrates an example in which an electronic device compares the first feature points of the first photo 610 stored in the electronic device and the second feature points of the photos retrieved as the second images to determine whether or not they match each other according to an embodiment of the present invention.

Referring to FIG. 6B, the first photo 610 includes a plurality of the first feature points. It is assumed that all marked points (i.e., orange points and red points of the first photo 610 in FIG. 6B) are the first feature points of the first photo 610. The image control module 170 may retrieve image 620 and image 630 on the basis of the location information of the first photo 610 as the second images. The image control module 170 detects the feature points of the image 620 and the image 630. According to an embodiment of the present invention, the feature points of the first image 620 and the second image 630 may be predetermined. Hereinafter, the feature points of the first image 620 and the second image 630 are referred to as the second feature points of the second images.

After the second feature points of the second images are determined, the point matching module 220 of the image control module 170 compares the first feature points of the first photo 610 with the second feature points of the image 620 to thereby find the feature points that match each other. In addition, as a result of the comparison, the point matching module 220 increases, by one, the matching count value of the first feature points of the first photo 610, which match the second feature points of the image 620.

The point matching module 220 of the image control module 170 compares the first feature points of the first photo 610 with the second feature points of the image 630 to thereby find the feature points that match each other. In addition, as a result of the comparison, the point matching module 220 increases, by one, the matching count value of the first feature points of the first photo 610, which match the second feature points of the image 630.

Referring to FIG. 6B, the point 611 of the first image 610 matches both the point 621 of the image 620 and the point 631 of the image 630. If the original matching count value of the first feature points of the first photo 610 is zero before comparing the feature points, the matching count value of the point 611 becomes two after the comparison. Likewise, the point 612 of the first photo 610 matches both the point 622 of the image 620 and the point 632 of the image 630. Therefore, the matching count value of the point 612 becomes two.

Here, it is assumed that the first feature points can be the important points only when the matching count value of the first feature points is greater than or equal to two, the point 611 and the point 612 becomes the important points of the first photo 610 (i.e., red points of the first photo 610 in FIG. 6B). According to an embodiment of the present invention, the image control module 170 may determine one or more of the second images having the second feature points that match the important points of the first images as the recommended images. In FIG. 6B, the image control module 170 may determine, as the recommended images, the image 620 and the image 630 that have the second feature points that match the important points, i.e., the point 611 or the point 612, of the first photo 610.

Figure 6C:
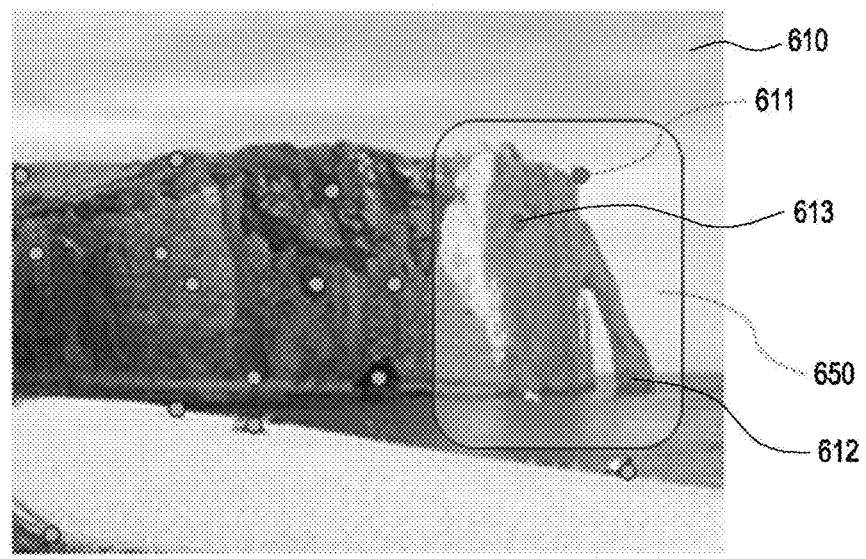
FIG. 6C illustrates an example in which an electronic device determines a feature area of a first image according to an embodiment of the present invention.

FIG. 6C illustrates an example in which an electronic device determines a feature area of the first image (i.e., the first photo 610) according to an embodiment of the present invention.

Referring to FIG. 6C, the first photo 610 has a plurality of feature points, and the point 611, the point 612, and the point 613 are the important points. The image control module 170 determines the area that includes at least some of the important points as a feature area. FIG. 6C shows that the image control module 170 determines the first feature area 650 that includes the important points, i.e., the first, second, and third points 611, 612 and 613 of the first photo 610, as a feature area.

Figure 6D:
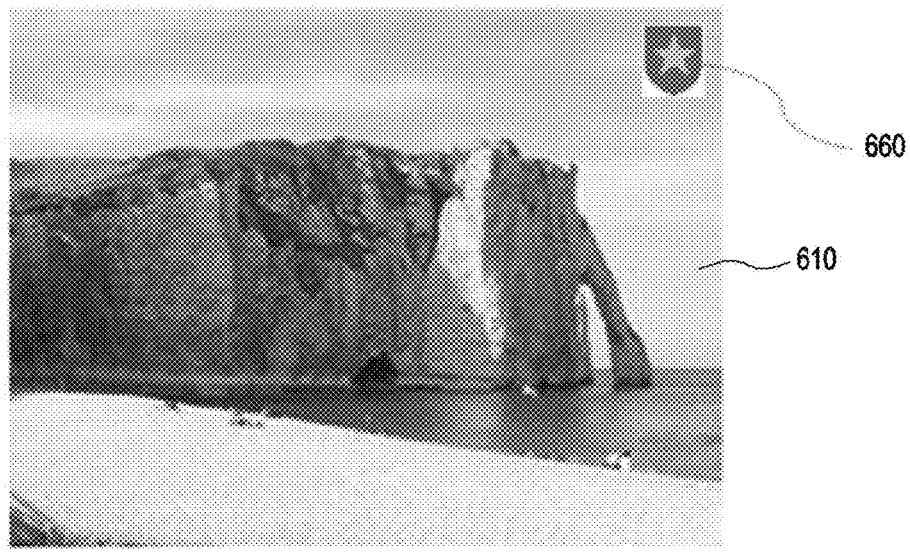
FIG. 6D illustrates an example in which an electronic device displays the first image, informing that there are recommended images with respect to the first image according to an embodiment of the present invention.

FIG. 6D illustrates an example in which an electronic device displays the first image (i.e., the first photo 610), informing that there are recommended images with respect to the first image (i.e., the first photo 610) according to an embodiment of the present invention.

Figure 7:
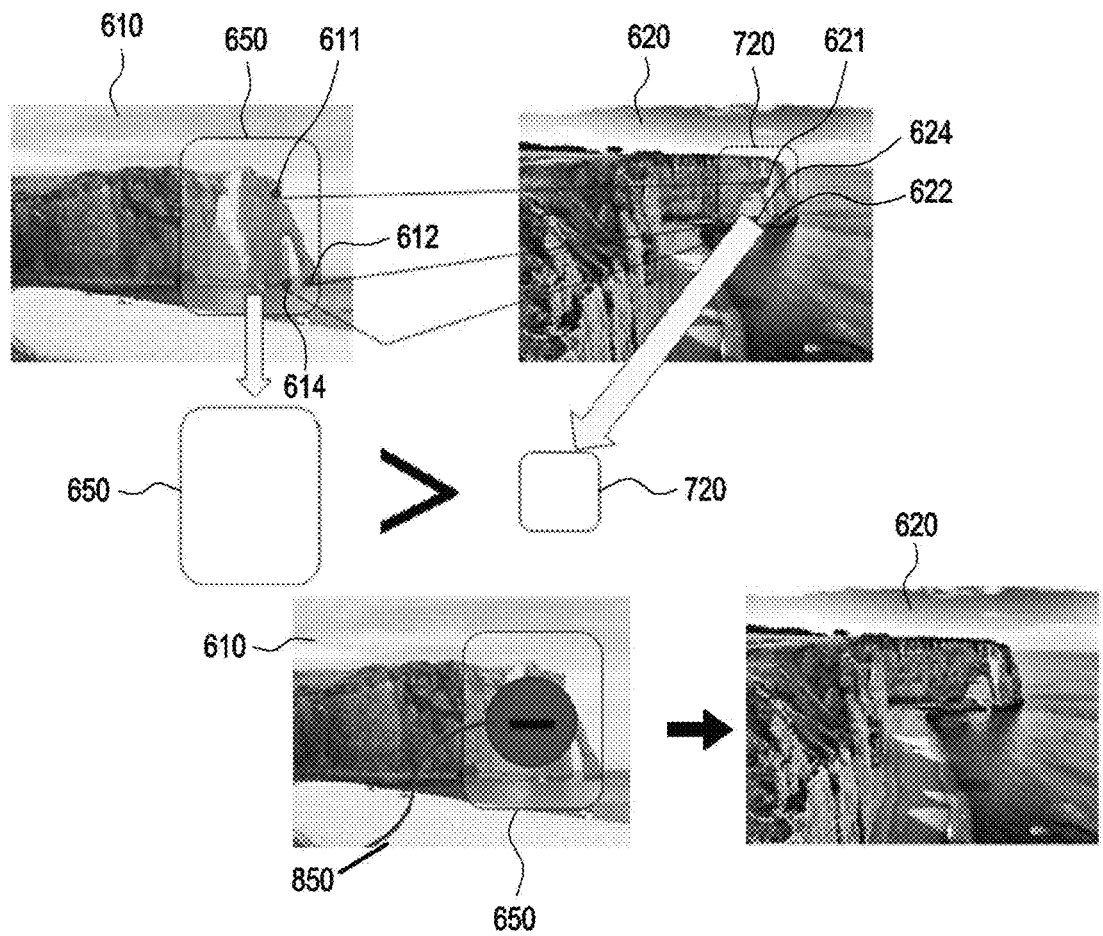
FIG. 7 illustrates an example in which the electronic device displays a recommended image according to an embodiment of the present invention.

Referring to FIG. 6D, the display 150 displays an icon 660 on the first photo 610, which informs that one or more recommended images corresponds to the first photo 610 exist FIG. 7 illustrates an example in which the electronic device displays a recommended image according to an embodiment of the present invention.

Referring to FIG. 7, the first image, i.e., the first photo 610, includes the important points, i.e., the point 611, point 612, and point 614. Here, the recommended image, i.e., the image 620, includes the point 621, point 622, and point 624 that match the important points of the first photo 610. The first feature area 650 including the important points, i.e., the point 611, point 612, and point 614 is displayed on the first photo 610. The second feature area 720 including the point 621, point 622, and point 624 that match the important points of the first photo 610 is displayed on the image 620.

That is, the image control module 170 may extract feature areas from the recommended images. According to an embodiment of the present invention, the image control module 170 may extract, as the feature area, the area including at least some of the second feature points that match the important points of the first image, from the recommended image. In addition, the image control module 170 may determine that the feature area of the recommended image reflects the same object as that of the first image. That is, the first feature area 650 and the second feature area 720 may be extracted from the photos of the same object in FIG. 7.

According to an embodiment of the present invention, the image control module 170 may compare the feature area (e.g., the second feature area 720) extracted from the recommended image with the feature area (e.g., the first feature area 650) of the first image. In FIG. 7, the first feature area 650 and the second feature area 720 are extracted from the photos of the same object, but the second feature area 720 is smaller than the first feature area 650. That is, although the first feature area 650 matches the second feature area 720, the image of the object shown in the feature area has been reduced (i.e., the image in the first feature area 650 has been reduced into the image in the second feature area 720). The image control module 170 may compare the feature area extracted from the recommended image with the feature area of the first image to thereby determine whether the feature area of the recommended image is reversed, enlarged or reduced, compared with the feature area of the first image.

According to an embodiment of the present invention, in displaying the first image and the recommended image corresponding to the first image through the display 150, the image control module 170 may display the feature area on the first image together with an indicator showing the existence of the recommended images that are enlarged, reduced or rotated images of the feature area. For example, an indicator 850 informing that there is a recommended image (e.g., image 620), in which the image in the feature area has been reduced, is displayed in the first feature area 650 on the first photo 610.

According to an embodiment of the present invention, when the user input for selecting the indicator 850 is received, the image control module 170 may control the display 150 to display the recommended image. In FIG. 7, the user input for selecting the indicator 850 is received by the electronic device 101, and the display 150 displays image 620.

Figure 8:
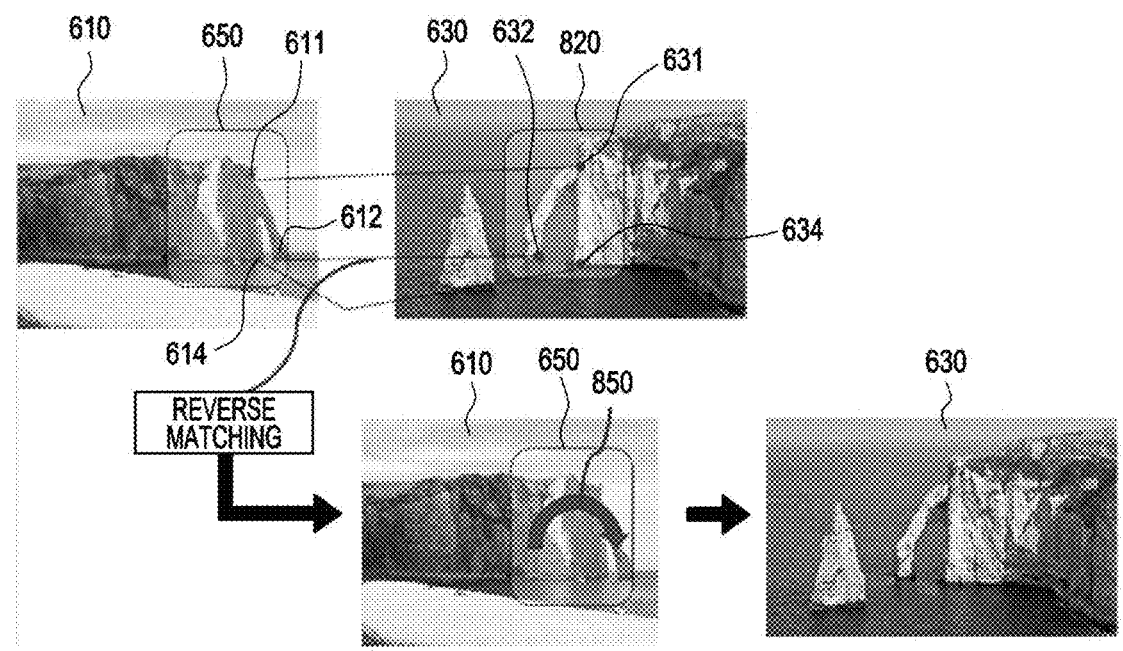
FIG. 8 illustrates another example in which the electronic device displays a recommended image according to an embodiment of the present invention.

FIG. 8 illustrates another example in which the electronic device displays a recommended image according to an embodiment of the present invention.

Referring to FIG. 8, the first image, i.e., the first photo 610, includes the important points, i.e., the point 611, point 612, and point 614. Here, the recommended image, i.e., the image 630, includes the point 631, point 632, and point 634 that match the important points of the first photo 610. The first feature area 650 including the important points, i.e., the point 611, point 612, and point 614 is displayed on the first photo 610. The second feature area 820 including the point 631, point 632, and point 634 that match the important points of the first photo 610 is displayed on the image 630.

Similar to FIG. 7, the image control module 170 may extract, as the feature area, the area including at least some of the feature points that match the important points of the first image from the recommended image. In addition, the image control module 170 may determine that the feature area of the recommended image and the feature area of the first image reflect the same object. That is, the first feature area 650 and the second feature area 820 may be extracted from the photos of the same object in FIG. 8.

According to an embodiment of the present invention, the image control module 170 may compare the feature area (e.g., the second feature area 820) extracted from the recommended image with the feature area (e.g., the first feature area 650) of the first image. In FIG. 8, the first feature area 650 and the second feature area 820 are extracted from the photos of the same object, but the first feature area 650 is reversed to the second feature area 820. That is, although the first feature area 650 matches the second feature area 820, the image of the object shown in the second feature area 820 is the reversed image of the object shown in the first feature area 650 (the image in the first feature area 650 is reversed from the image in the second feature area 820).

According to an embodiment of the present invention, in displaying the first image and the recommended image corresponding to the first image through the display 150, the image control module 170 may display the feature area on the first image together with an indicator showing the existence of the recommended images that contain enlarged, reduced or rotated images of the feature area. For example, an indicator 850 informing that there is a recommended image (e.g., the image 630), in which the image in the feature area is reversed, is displayed in the first feature area 820 on the first photo 610.

Figure 9:
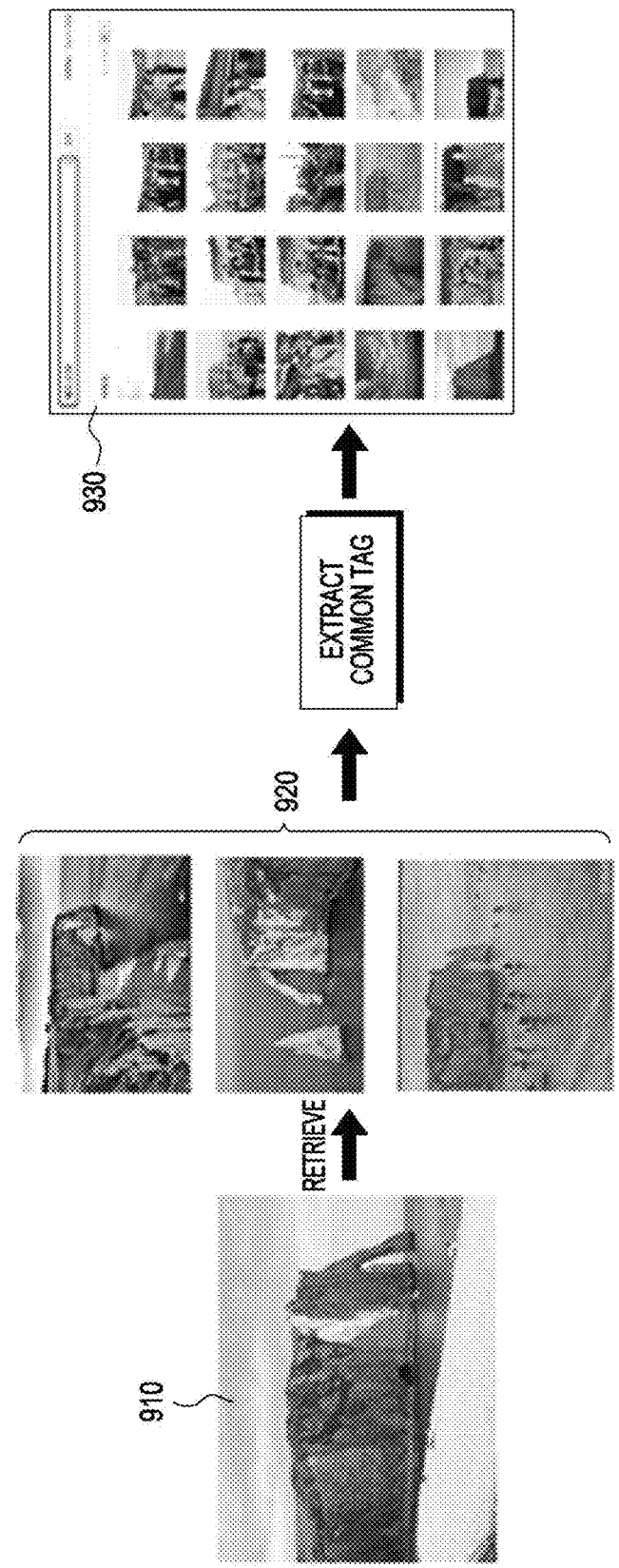
FIG. 9 illustrates an example in which the electronic device retrieves the second images according to an embodiment of the present invention.

According to an embodiment of the present invention, when the user input for selecting the indicator 850 is received, the image control module 170 controls the display 150 to display the recommended image, i.e., the image 630. FIG. 9 illustrates an example in which the electronic device retrieves the second images according to an embodiment of the present invention.

Referring to FIG. 9, the image control module 170 of the electronic device 101 may retrieve one or more of the second images by using the location information (e.g., GPS coordinates) of the first image (i.e., the photo 910), and may determine one or more recommended images 920 from the second images. According to an embodiment of the present invention, the image control module 170 of the electronic device 101 may extract meta-data, for example, a tag, from the recommended images 920. The image control module 170 may determine common meta-data on the basis of meta-data of the recommended images 920. Referring to FIG. 9, the image control module 170 extracts a common tag (e.g., location of photographing, object name, or the like) as common meta-data among meta-data of the recommended images 920. According to an embodiment of the present invention, the image control module 170 may retrieve the images by using the common tag. In FIG. 9, the image control module 170 retrieves the images 930 in the manner of TBIR according to the common tag. In addition, the image control module 170 may record the common tag as meta-data of the photo 910.

For example, when the photo of the Eiffel Tower taken by the camera module 180 is used as the first image, the image control module 170 may retrieve other photos that have been taken at the location of the Eiffel Tower or near thereto by using the location information of the photo of the Eiffel Tower. In addition, the image control module 170 may determine the recommended images from the photo of the Eiffel Tower and retrieved photos, i.e., the second images. Since the recommended images have been taken at the location of the Eiffel Tower or near thereto, the image control module 170 may extract the meta data and determine "the Eiffel Tower" as the common meta-data from the recommended images. The image control module 170 may record "the Eiffel Tower" as the common tag of the photo. In addition, the image control module 170 may retrieve and obtain the images related to "the Eiffel Tower" by using the common tag, i.e., "the Eiffel Tower," of the recommended images.

Figure 10:
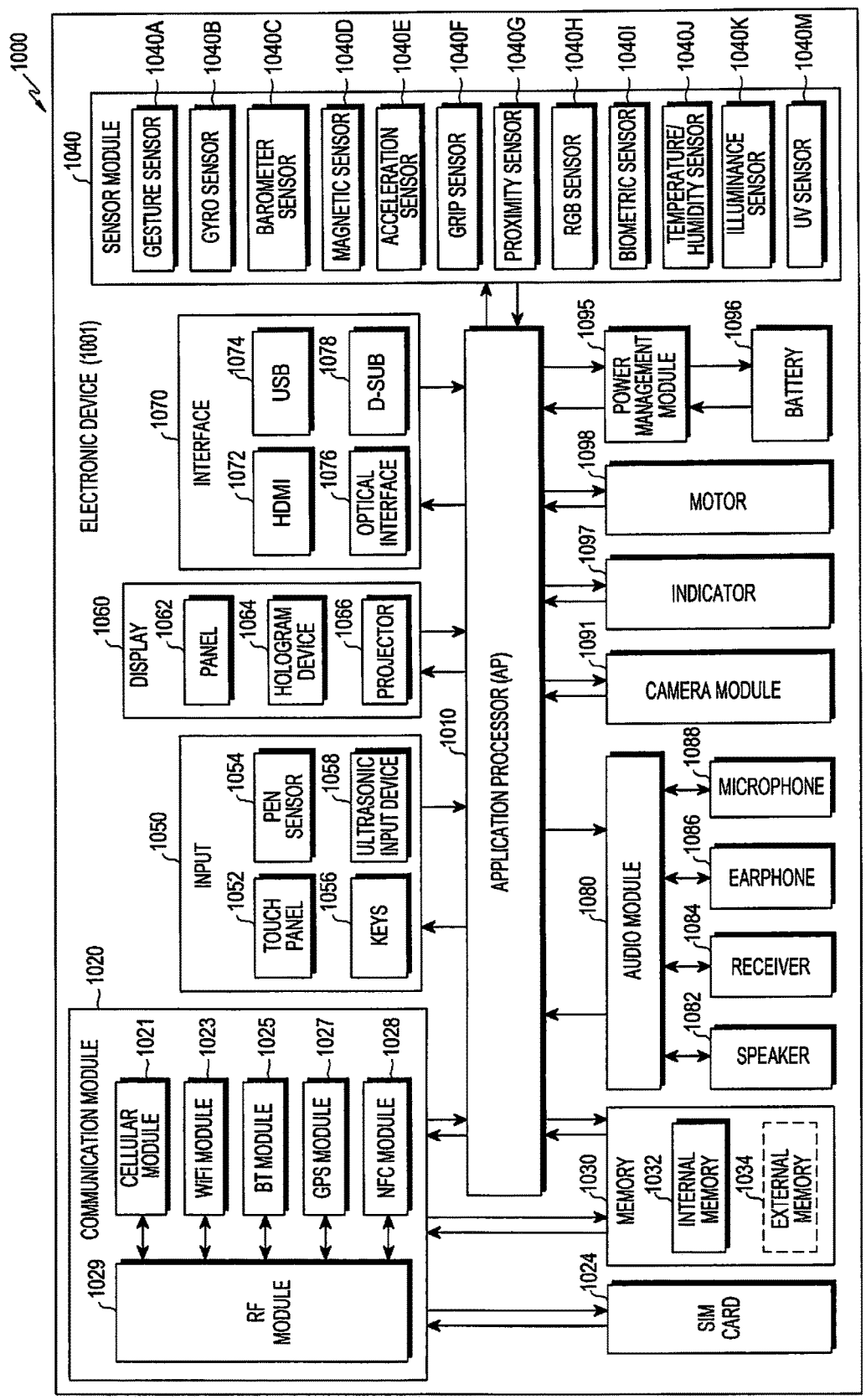
FIG. 10 is a block diagram of a configuration of an electronic device according to an embodiment of the present invention.

FIG. 10 is a block diagram 1000 of a configuration of an electronic device 1001 according to an embodiment of the present invention. For example, the electronic device 1001 may constitute a part of or all of the electronic device 101 shown in FIG. 2. Referring to FIG. 10, the electronic device 1001 includes at least one application processor (AP) 1010, a communication module 1020, a subscriber identification module (SIM) card 1024, a memory 1030, a sensor module 1040, an input module 1050, a display 1060, an interface 1070, an audio module 1080, a camera module 1091, a power management module 1095, a battery 1096, an indicator 1097, and a motor 1098.

The AP 1010 controls a multitude of hardware or software elements connected with the AP 1010 and performs processing of various data including multimedia data and calculation, by performing an operating system or application programs. The AP 1010 may be implemented by, for example, a system on chip (SoC). According to an embodiment of the present invention, the AP 1010 may further include a graphic processing unit (GPU).

The communication module 1020 (e.g., the communication interface 160) performs transmission and reception of data between the electronic device 1001 (e.g., the electronic device 101) and other electronic devices (e.g., the electronic device 104 or the server 106) connected with the electronic device 1001 through networks. According to an embodiment of the present invention, the communication module 1020 may include a cellular module 1021, a Wi-Fi module 1023, a BT module 1025, a GPS module 1027, an NFC module 1028, and a radio frequency (RF) module 1029.

The cellular module 1021 provides services of voice calls, video calls and text messaging, or an Internet service through communication networks (e.g., LTE, LTE-A, CDMA, WCDMA, UMTS, WiBro, GSM, or the like). For example, the cellular module 1021 may perform identification and authentication of electronic devices in communication networks by using subscriber identification modules (e.g., the SIM card 1024). According to an embodiment of the present invention, the cellular module 1021 performs at least some of the functions provided by the AP 1010. For example, the cellular module 1021 may perform at least some of the multimedia control functions.

According to an embodiment of the present invention, the cellular module 1021 may include a communication processor (CP). For example, the cellular module 1021 may be implemented by a SoC. Although elements such as the cellular module 1021 (e.g., the communication processor), the memory 1030, or the power management module 1095 are illustrated to be separate from the AP 1010 in FIG. 10, according to an embodiment of the present invention, the AP 1010 may include at least some (e.g., the cellular module 1021) of the above-described elements.

According to an embodiment of the present invention, the AP 1010 or the cellular module 1021 (e.g., the communication processor) loads instructions or data received from at least one of the non-volatile memories or other elements, which are connected with the AP 1010 or cellular module 1021, to volatile memories and processes the same. In addition, the AP 1010 or cellular module 1021 stores data that is received or created from or by at least one of other elements in non-volatile memories.

For example, each of the Wi-Fi module 1023, the BT module 1025, the GPS module 1027 and the NFC module 1028 may include a processor for processing data transmitted and received through the corresponding module. Although the cellular module 1021, the Wi-Fi module 1023, the BT module 1025, the GPS module 1027 or the NFC module 1028 are illustrated as separated blocks in FIG. 10, according to an embodiment of the present invention, at least some (e.g., two or more) of the cellular module 1021, the Wi-Fi module 1023, the BT module 1025, the GPS module 1027, or the NFC module 1028 may be included in one integrated chip (IC) or one IC package. For example, at least some processors (e.g., the communication processor corresponding to the cellular module 1021, or a Wi-Fi processor corresponding to the Wi-Fi module 1023) corresponding to the cellular module 1021, the Wi-Fi module 1023, the BT module 1025, the GPS module 1027 and the NFC module 1028 may be implemented by a single SoC.

The RF module 1029 transmits and receives data, for example, RF signals. The RF module 1029 may include, for example, a transceiver, a power amp module (PAM), a frequency filter, a low noise amplifier (LNA), or the like. For example, the RF module 1029 may further include components such as conductors or cables for transmitting and receiving electromagnetic waves through the free space in wireless communication. Although the cellular module 1021, the Wi-Fi module 1023, the BT module 1025, the GPS module 1027 and the NFC module 1028 share a single RF module 1029 in FIG. 10, according to an embodiment of the present invention, at least one of the cellular module 1021, the Wi-Fi module 1023, the BT module 1025, the GPS module 1027 and the NFC module 1028 may transmit and receive RF signals through separated modules.

The SIM card 1024 is a card adopting a subscriber identification module, and may be inserted into a slot formed at predetermined positions of the electronic device. The SIM card 1024 may include inherent identification information (e.g., an integrated circuit card identifier (ICCID)) or subscriber information (e.g., an international mobile subscriber identity (IMSI)).

The memory 1030 (e.g., the memory 130) may include an internal memory 1032 or an external memory 1034. The internal memory 1032 may include at least one of volatile memories {e.g., a dynamic RAM (DRAM), a static RAM (SRAM), a synchronous dynamic RAM (SDRAM), or the like} or non-volatile Memories {e.g., an one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like}.

According to an embodiment of the present invention, the internal memory 1032 may be a solid-state drive (SSD). The external memory 1034 may further include a flash drive, for example, a compact flash (CF), a secure digital (SD), a micro secure digital (Micro-SD), a mini secure digital (Mini-SD), an extreme digital (xD), a memory stick, or the like. The external memory 1034 may be functionally connected with the electronic device 1001 through various interfaces. According to an embodiment of the present invention, the electronic device 1001 may further include a storage device (or a storage medium) such as a hard drive.

The sensor module 1040 measures physical quantities and detects an operation state of the electronic device 1001, to thereby convert the measured or detected information to electric signals. The sensor module 1040 may include at least one of, for example, a gesture sensor 1040A, a gyro-sensor 1040B, an atmospheric sensor 1040C, a magnetic sensor 1040D, an acceleration sensor 1040E, a grip sensor 1040F, a proximity sensor 1040G, a color sensor 1040H (e.g., a red-green-blue (RGB) sensor), a bio sensor 1040I, a temperature/humidity sensor 1040J, an illuminance sensor 1040K, or an ultra violet (UV) sensor 1040M. Alternatively, the sensor module 1040 may further include an E-nose sensor, an electromyography sensor (EMG), an electroencephalogram sensor (EEG), an electrocardiogram sensor (ECG), an infrared (IR) sensor, an iris sensor, or a fingerprint sensor, or the like. The sensor module 1040 may further include a control circuit for controlling at least one sensor included therein.

The input module 1050 may include a touch panel 1052, a (digital) pen sensor 1054, keys 1056, or an ultrasonic input device 1058. The touch panel 1052 recognizes a touch input by at least one of, for example, a capacitive type, a pressure type, an infrared type, or an ultrasonic type. In addition, the touch panel 1052 may further include a control circuit. In the case of a capacitive type, a physical contact or access can be detected. The touch panel 1052 may further include a tactile layer. In this case, the touch panel 1052 may provide a user with a tactile reaction.

For example, the (digital) pen sensor 1054 may be implemented by using, for example, a method that is the identical or similar to a user's touch input or by using a separate recognition sheet. The keys 1056 may include, for example, physical buttons, optical keys, or a keypad. The ultrasonic input device 1058 detects acoustic waves with a microphone 1088 in the electronic device 1001 through an input means that generates ultrasonic signals to thereby identify data. The ultrasonic input device 1058 performs wireless recognition. According to an embodiment of the present invention, the electronic device 1001 may receive a user input from external devices (e.g., computers, or servers) which are connected with the electronic device by using the communication module 1020.

The display 1060 (e.g., the display 150) may include a panel 1062, a hologram device 1064, or a projector 1066. The panel 1062 may be, for example, a liquid crystal displays (LCD), an active-matrix organic light-emitting diode (AM-OLED), or the like. The panel 1062 may be implemented to be, for example, flexible, transparent or wearable. The panel 1062 may be configured with the touch panel 1052 as a single module. The hologram device 1064 may display 3D images in the air by using interference of light. The projector 1066 displays images by projecting light onto a screen. The screen may be positioned, for example, inside or outside the electronic device 1001. According to an embodiment of the present invention, the display 1060 may further include a control circuit for controlling the panel 1062, the hologram device 1064, or the projector 1066.

Figure 1B:
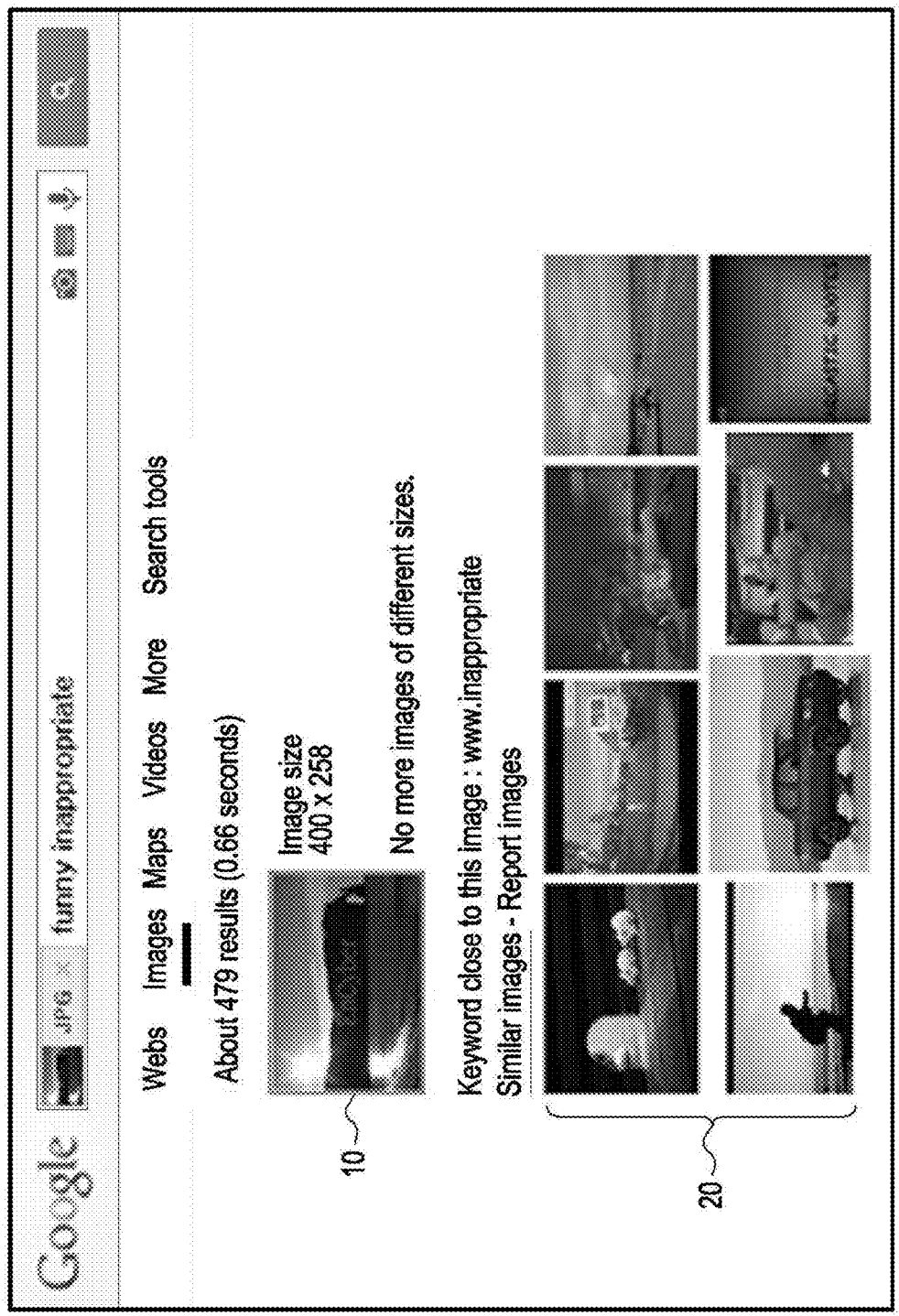
FIG. 1B illustrates an example in which images are retrieved by the CBIR method.

The interface 1070 may include, for example, a high-definition multimedia interface (HDMI) 1072, a universal serial bus (UBS) 1074, an optical interface 1076, or a D-subminiature (D-sub) 1078. The interface 1070 may be included in, for example, the communication interface 160 shown in FIG. 1. Alternatively, the interface 1070 may include, for example, a mobile high-definition link (MHL) interface, a secure digital (SD) card/multi-media card (MMC) interface or an infrared data association (IrDA) standard interface.

The audio module 1080 converts a sound into an electric signal, and vice versa. At least some elements of the audio module 1080 may be included, for example, in the input/output interface 140 shown in FIG. 3. For example, the audio module 1080 may process voice information input or output through a speaker 1082, a receiver 1084, an earphone 1086 or a microphone 1088.

According to an embodiment of the present invention, the camera module 1091 is a device for photographing still and moving images, and may include at least one image sensor (e.g., a front sensor or a rear sensor), lenses, an image signal processor (ISP), or a flash (e.g., LED or a xenon lamp).

The power control module 1095 manages power of the electronic device 1001. Although not shown, the power management module 1095 may include, for example, a power management integrated circuit (PMIC), a charger integrated circuit (IC), or a battery gauge.

The PMIC may be mounted, for example, in integrated circuits or SoC semiconductors. The charging may be conducted by a wired type and a wireless type. The charger IC charges a battery and prevents inflow of an excessive voltage or current from the charger. According to an embodiment of the present invention, the charger IC may include a charger IC for at least one of the wired charging type or the wireless charging type. The wireless charging type may encompass, for example, a magnetic resonance type, a magnetic induction type or an electromagnetic wave type, and additional circuits for wireless charging, for example, coil loops, resonance circuits, rectifiers, or the like, may be provided.

The battery gauge measures, for example, the remaining power of the battery 1096, a charging voltage and current, or temperature. The battery 1096 stores or generates electric power, and supplies power to the electronic device 1001 by using the stored or generated electric power. The battery 1096 may include, for example, a rechargeable battery or a solar battery.

The indicator 1097 displays a specific state, for example, a booting state, a message state or a charging state of the whole or a part (e.g., the AP 1010) of the electronic device 1001. The motor 1098 converts electric signals to a mechanical vibration. Although not shown, the electronic device 1001 may include a processing device (e.g., the GPU) for supporting a mobile TV. The processing device for supporting a mobile TV may process media data according to the standard such as, for example, digital multimedia broadcasting (DMB), digital video broadcasting (DVB) or media flow.

The above described components of the electronic device according to an embodiment of the present invention may be formed of one or more components, and a name of a corresponding component element may be changed based on the type of electronic device. The electronic device according to the present invention may include one or more of the aforementioned components or may further include other additional components, or some of the aforementioned components may be omitted. Further, some of the components of the electronic device according to the an embodiment of the present invention may be combined to form a single entity, and thus, may equivalently execute functions of the corresponding elements prior to the combination.

Figure 11:
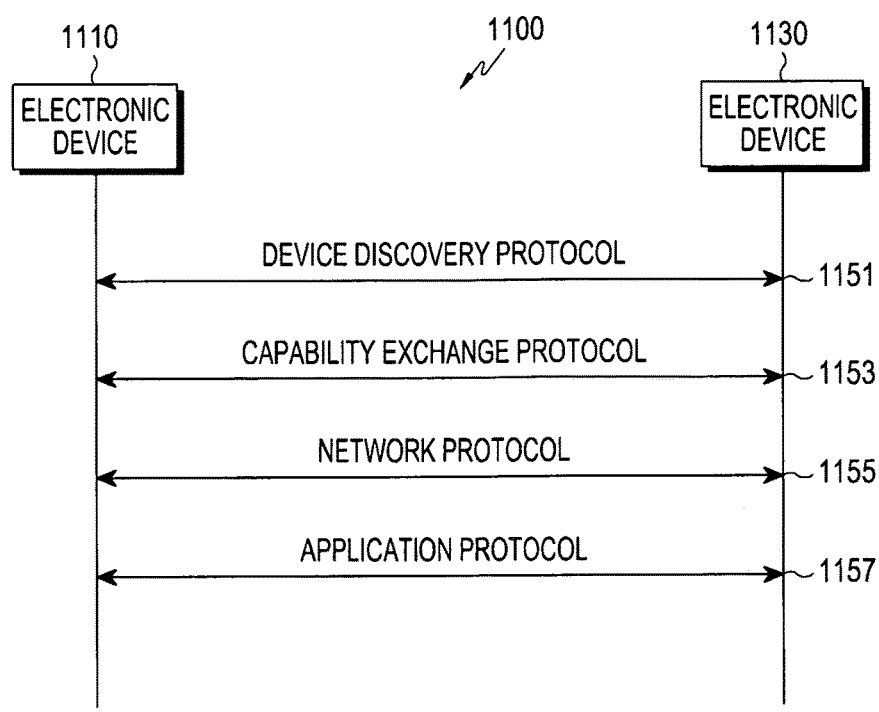
FIG. 11 illustrates communication protocols between electronic devices according to an embodiment of the present invention.

FIG. 11 illustrates communication protocols 1100 between electronic devices (e.g., electronic device 1110 and electronic device 1130) according to an embodiment of the present invention. Referring to FIG. 11, for example, the communication protocols 1100 includes a device discovery protocol 1151, a capability exchange protocol 1153, a network protocol 1155, and an application protocol 1157.

According to an embodiment of the present invention, the device discovery protocol 1151 may be used for detecting external electronic devices that can communicate with the electronic devices (e.g., electronic device 1110 or electronic device 1130) or connecting the electronic devices with the external electronic devices. For example, the electronic device 1110 (e.g., electronic device 101) may detect the electronic device 1130 (e.g., electronic device 104) as the device that can communicate with the electronic device 1110 through an available communication method (e.g., WiFi, BT, USB, or the like) in the electronic device 1110, by using the device discovery protocol 1151. The electronic device 1110 may obtain and store identification information of the detected electronic device 1130 by using the device discovery protocol 1151 in order to make a communication connection with the electronic device 1130. The electronic device 1110 may open the communication channel for the electronic device 1130, for example, based on the identification information.

According to another embodiment of the present invention, the device discovery protocol 1151 may be used for authentication between a plurality of electronic devices. For example, the electronic device 1110 may perform authentication between the electronic device 1110 and the electronic device 1130, based on communication information (e.g., media access control (MAC) address, universally unique identifier (UUID), subsystem identification (SSID), information provider (IP) address, or the like) for the connection with the electronic device 1130.

According to an embodiment of the present invention, the capability exchange protocol 1153 may be used for exchanging information related to functions of services that are supported by either the electronic device 1110 or the electronic device 1130. For example, the electronic device 1110 and the electronic device 1130 may exchange information related to services provided by them through the capability exchange protocol 1153. The exchangeable information may include identification information that indicates a specific service among a plurality of services supported by the electronic device 1110 and the electronic device 1120. For example, the electronic device 1110 may receive the identification information of the specific service provided by the electronic device 1130 through the capability exchange protocol 1153. In this case, the first electronic device 1110 may determine whether the electronic device 1110 can support the specific service, based on the received identification information.

According to an embodiment of the present invention, the network protocol 1155 may be used for controlling a flow of data that is transmitted or received to provide associated services between electronic devices (e.g., electronic device 1110 and electronic device 1130) that are connected to each other for communication. For example, either the electronic device 1110 or the electronic device 1130 may perform error control or data quality control by using the network protocol 1155. Alternatively, the network protocol 1155 may determine the transmission format of data transmitted or received between the electronic device 1110 and the electronic device 1130. In addition, at least one of the electronic device 1110 or the electronic device 1130 may manage sessions (e.g., session connection or session termination) for exchanging data by using the network protocol 1155.

According to an embodiment of the present invention, the application protocol 1157 may be used for providing procedures or information of exchanging data related to services provided to the external electronic devices. For example, the electronic device 1110 (e.g., electronic device 101) may provide services to the electronic device 1130 (e.g., electronic device 104 or server 106) through the application protocol 1157.

According to an embodiment of the present invention, the communication protocol 1100 may include standard communication protocols, protocols designated by a person or a group (e.g., communication protocols designated by communication device manufacturers or network providers), or a combination thereof.

According to various embodiments of the present invention, at least some of the devices (e.g., modules or functions thereof) or methods (e.g., operations) according to the various embodiments of the present invention may be implemented as, for example, instructions stored computer readable storage media in the form of programming modules. When he command is executed by one or more processors (for example, the processor 210), the one or more processors may execute a function corresponding to the command. The non-transitory computer-readable storage medium may be, for example, the memory 130. At least some of the programming modules may be implemented (for example, executed) by, for example, the processor 120. At least some of the programming modules may include, for example, a module, a program, a routine, a set of instructions, or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

A module or a programming module according to the present invention may include at least one of the described component elements, a few of the component elements may be omitted, or additional component elements may be included. Operations executed by a module, a programming module, or other component elements according to various embodiments of the present invention may be executed sequentially, in parallel, repeatedly, or in a heuristic manner. Furthermore, some operations may be executed in a different order or may be omitted, or other operations may be added.

The embodiments of the present invention disclosed in the specification and the drawings are only particular examples proposed in order to easily describe the technical matters of the present invention and help with comprehension of the present invention, and do not limit the scope of the present invention. Therefore, in addition to the embodiments disclosed herein, the scope of the various embodiments of the present invention should be construed to include all modifications or modified forms drawn based on the technical idea of the various embodiments of the present invention as defined by the appended claims and their equivalents.

What is claimed is:

1. A method for displaying one or more images in an electronic device, the method comprising:
    displaying a first image;
    retrieving at least one second image on the basis of additional information of the first image;
    comparing at least one first feature point of the first image with at least one second feature point of the at least one second image to determine whether they match each other;
    incrementing a matching count value of a first feature point of the at least one first feature point, upon determining that the first feature point matches a second feature point of the at least one second image;
    displaying information on whether at least one recommended image from among the at least one second image having the second feature point that matches the first feature point exists, based on the matching count value; and
    if the at least one recommended image exists, displaying the at least one recommended image according to a user input.

2. The method of claim 1, wherein the first image is pre-stored, or received from outside to be stored.

3. The method of claim 1, wherein the additional information is information included in a tag of the first image.

4. The method of claim 1, wherein comparing at least one first feature point of the first image with at least one second feature point of the at least one second image comprises comparing directions, sizes, and a created time of the first image and the at least one second image.

5. The method of claim 4, wherein displaying the at least one recommended image according to the user input comprises displaying the first image together with the at least one second image, of which the directions, the sizes, and the created time are compared.

6. The method of claim 1, wherein the user input is a tactile input by which a screen of the electronic device is touched, or a non-tactile input by which the screen of the electronic device is not touched.

7. The method of claim 1, wherein displaying the information on whether the at least one recommended image exists comprises:
    determining the first feature point having the matching count value greater than or equal to a predetermined reference value as an important point;
    determining the at least one second image having the second feature point that matches the important point as the at least one recommended image; and
    displaying an indicator on the first image upon determining that the at least one recommended image exists.

8. A method for displaying one or more images in an electronic device, the method comprising:
    determining at least one first feature point of a first image;
    retrieving at least one second image on the basis of location information of the first image;
    detecting at least one second feature point of the at least one second image;
    incrementing a matching count value of a first feature point of the at least one first feature point, upon determining that the first feature point matches a second feature point of the at least one second image;
    determining at least one recommended image from among the at least one second image having the second feature point that matches the first feature point, based on the matching count value; and
    displaying the at least one recommended image.

9. The method of claim 8, wherein determining the at least one recommended image comprises:
    determining the first feature point having the matching count value greater than or equal to a predetermined reference value as an important point; and
    determining the at least one second image having the second feature point that matches the important point as the at least one recommended image.

10. The method of claim 9, wherein incrementing the matching count value comprises, increasing the matching count value by one.

11. The method of claim 9, further comprising:
    determining a first feature area including the important point in the first image;
    determining a second feature area, including the second feature point that matches the important point, of the at least one recommended image;
    comparing the first feature area with the second feature area; and
    determining whether an image of the second feature area is enlarged, reduced, or reversed, compared with an image of the first feature area.

12. The method of claim 11, further comprising:
    if the image of the second feature area is reduced compared with the image of the first feature area, displaying the first image together with a reduction indicator in the first feature area thereof; and
    when a user input for selecting the reduction indicator is received, displaying the at least one recommended image instead of the first image.

13. The method of claim 11, further comprising:
    if the image of the second feature area is enlarged compared with the image of the first feature area, displaying the first image together with an enlargement indicator in the first feature area thereof; and
    when a user input for selecting the enlargement indicator is received, displaying the at least one recommended image instead of the first image.

14. The method of claim 11, further comprising:
    if the image of the second feature area is reversed compared with the image of the first feature area, displaying the first image together with an reversal indicator in the first feature area thereof; and
    when a user input for selecting the reversal indicator is received, displaying the at least one recommended image instead of the first image.

15. The method of claim 8, wherein displaying the at least one recommended image comprises:
    whenever the first image is displayed, displaying an icon corresponding to each of the at least one recommended image in the first image; and when a user input for selecting the icon is received, displaying the corresponding at least one recommended image instead of the first image.

16. The method of claim 8, wherein retrieving the at least one second image on the basis of the location information of the first image comprises retrieving photos that have been taken at a location of a same GPS coordinate as that of the first image, or at a location near thereto.

17. An electronic device for displaying one or more images, the electronic device comprising:
a display configured to display a first image;
a processor configured to:
determine at least one first feature point in the first image,
retrieve at least one second image on the basis of additional information of the first image,
extract at least one second feature point from the at least one second image,
increment a matching count value of a first feature point of the at least one first feature point, upon determining that the first feature point matches a second feature point of the at least one second image;
determine at least one recommended image from among the at least one second image having the second feature point that matches the first feature point on the basis of the matching count value, and
control the display to display the at least one recommended image according to a user input.

18. The electronic device of claim 17, wherein the processor is further configured to:
determine the first feature point having the matching count value greater than or equal to a predetermined reference value as an important point, and
determine the at least one second image having the second feature point that matches the important point as the at least one recommended image.

19. The electronic device of claim 18, wherein incrementing the matching count value comprises:
increasing the matching count value by one.

20. The electronic device of claim 18, wherein the processor is further configured to:
determine a first feature area including the important point in the first image, to determine a second feature area, including the second feature point that matches the important point, of the at least one recommended image,
compare the first feature area with the second feature area, and
determine whether an image of the second feature area is enlarged, reduced, or reversed, compared with an image of the first feature area.

21. The electronic device of claim 20, wherein,
if the image of the second feature area is reduced compared with the image of the first feature area, the display is further configured to display the first image together with a reduction indicator in the first feature area thereof, and,
when a user input for selecting the reduction indicator is received, the display is further configured to display the at least one recommended image instead of the first image.

22. The electronic device of claim 20, wherein,
if the image of the second feature area is enlarged compared with the image of the first feature area, the display is further configured to display the first image together with an enlargement indicator in the first feature area thereof, and,
when a user input for selecting the enlargement indicator is received, the display is further configured to display the at least one recommended image instead of the first image.

23. The electronic device of claim 20, wherein,
if the image of the second feature area is reversed compared with the image of the first feature area, the display is further configured to display the first image together with an reversal indicator in the first feature area thereof, and
when a user input for selecting the reversal indicator is received, the display is further configured to display the at least one recommended image instead of the first image.

24. The electronic device of claim 17, wherein the display is further configured to display the first image together with an icon corresponding to each of the at least one recommended image, and to display the corresponding at least one recommended image instead of the first image according to a user input for selecting the icon.

25. The electronic device of claim 17, wherein the processor is further configured to retrieve photos that have been taken at a location of a same GPS coordinate as that of the first image, or a location near thereto.

* * * * *